(12) United States Patent
Cavaliere et al.

(10) Patent No.: US 9,876,603 B2
(45) Date of Patent: Jan. 23, 2018

(54) PARAMETER CONTROL FOR OPTICAL MULTICARRIER SIGNAL

(71) Applicant: Telefonaktiebolaget LM Ericsson (publ), Stockholm (SE)

(72) Inventors: Fabio Cavaliere, Pisa (IT); Roberto Magri, Pisa (IT); Philip Nibbs, Melbourne (AU)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 54 days.

(21) Appl. No.: 14/909,079

(22) PCT Filed: Aug. 1, 2013

(86) PCT No.: PCT/EP2013/066218
§ 371 (c)(1),
(2) Date: Jan. 29, 2016

(87) PCT Pub. No.: WO2015/014405
PCT Pub. Date: Feb. 5, 2015

(65) Prior Publication Data
US 2016/0164626 A1    Jun. 9, 2016

(51) Int. Cl.
*H04B 10/11* (2013.01)
*H04L 1/00* (2006.01)
*H04B 10/516* (2013.01)

(52) U.S. Cl.
CPC ......... *H04L 1/0006* (2013.01); *H04B 10/516* (2013.01); *H04L 1/0009* (2013.01)

(58) Field of Classification Search
CPC .... H04L 1/0006; H04L 1/0009; H04B 10/516
(Continued)

(56) References Cited

U.S. PATENT DOCUMENTS

| 5,699,365 A * | 12/1997 | Klayman | H03M 13/35 714/708 |
| 2008/0056181 A1* | 3/2008 | Imamura | H04L 1/0003 370/329 |
| 2008/0256421 A1* | 10/2008 | Gerstel | H03M 13/353 714/776 |
| 2012/0155310 A1* | 6/2012 | Kreuzer | H04W 52/146 370/252 |

(Continued)

OTHER PUBLICATIONS

Gho, "Rate-Adaptive Coding for Optical Fiber Transmission Systems" Journal of Lightwave Technology Year: 2011, vol. 29, issue: 2 pp. 222-233.*

(Continued)

*Primary Examiner* — Juan A Torres
(74) *Attorney, Agent, or Firm* — Leffler Intellectual Property Law, PLLC

(57) ABSTRACT

An optical multi carrier signal has a modulation format and has many individual carrier signals. Parameters of the signal are controlled by receiving an indication of individual carrier transmission performance of the individual carrier signals, and selecting parameter values for the individual carrier signals, the parameter values comprising both a carrier FEC overhead and a carrier bandwidth for the modulation format. Selection is made according to the indicated individual carrier transmission performance and according to an overall spectral efficiency of the multi carrier signal. The selected parameter values are output for control of the optical multi carrier signal. By selecting values for both parameters rather than either one, better optimization can be obtained since they are interdependent. The control can have better granularity than changing modulation format, and can make better use of bandwidth or improve the overall capacity.

16 Claims, 13 Drawing Sheets

(58) Field of Classification Search
USPC .......................................................... 398/183
See application file for complete search history.

(56) References Cited

U.S. PATENT DOCUMENTS

| | | | | |
|---|---|---|---|---|
| 2012/0213174 A1* | 8/2012 | Manea | ................. | H04L 1/0003 370/329 |
| 2013/0215813 A1* | 8/2013 | Kotecha | ................ | H04L 1/0017 370/312 |
| 2013/0223255 A1* | 8/2013 | Enescu | ................ | H04W 24/10 370/252 |

OTHER PUBLICATIONS

ITU-T G.694.1 "Spectral grids for WDM applications: DWDM frequency grid" Feb. 2012.*

PCT International Search Report, dated Jan. 8, 2014, in connection with International Application No. PCT/EP2013/066218, all pages.

DVB Organization: tm4877.TM-S2, Preliminary Report of the Study Mission on Revolutionary Techniques for Satellite, Geneva, Switzerland, Jun. 3, 2013, 71 pages.

Frederik Rusek et al., Serial and Parallel Concatenations Based on Faster Than Nyquist Signaling, Information Theory, 2006 IEEE International Symposium, Jul. 1, 2006, pp. 1993-1997.

Angelos D. Liveris and Costas N. Georghiades, Exploiting Faster-Than-Nyquist Signaling, IEEE Transactions on Communications, vol. 51, No. 9, Sep. 2003, pp. 1502-1511.

Alan Barbieri et al., Time-Frequency Packing for Linear Modulations: Spectral Efficiency and Practical Detection Schemes, IEEE Transactions on Communications, vol. 57, No. 10, Oct. 2009, pp. 2951-2959.

* cited by examiner

PARAMETER CONTROL FOR OPTICAL MULTICARRIER SIGNAL

FIELD

The present invention relates to apparatus for controlling parameters of an optical multicarrier signal, to methods of controlling the parameters and to corresponding computer programs.

BACKGROUND

The rapid growth of the number of connected devices and supported cloud services is driving the introduction of beyond-100 Gbit/s optical channels in the DWDM optical transport infrastructure: 400 Gbit/s will be the first step, followed by 1 Tbit/s. Due to a) the difficulty of providing electronic circuits to run at such high speeds and b) performance degradation introduced by linear and non-linear impairments in optical fiber, 400 Gbit/s and 1 Tbit/s transmissions typically rely on multi carrier techniques: in the most general scheme M tributary data flows are mapped into N independently modulated optical carriers where overhead for FEC or pilot symbols is added to payload bits. These data flows with FEC overhead are used to modulate carriers and converted to optical domain signals to create an optical multicarrier signal. Adaptive modulation format is usually proposed as a technique to adjust the aggregate capacity accordingly to the propagation impairments experienced by the channels so that high order modulation formats, e.g. 16QAM, can be used on short links in order to maximize the spectral efficiency while low order modulation formats (e.g. QPSK) could be configured for longer link or in case of unexpected link degradation.

The deployment of new infrastructures is usually a major source of cost for operators so that 20 or 30 years long network lifetime needs to be planned in order to have a full return of the investment. During this period, the traffic demand is expected to significantly increase so that, from a mere business perspective, increasing the spectral efficiency is just a way to save cost prolonging the infrastructure lifetime. This is the main reason behind the introduction of 40 and 100 Gbit/s optical interfaces and explains why they are being installed despite them never reaching a satisfactory cost point with respect to an equivalent number of 10 Gbit/s optical interfaces. Of course, similar considerations apply for 400 Gbit/s and Tbit/s optical interfaces.

Although very high values of spectral efficiency are possible in principle, technology issues and actual network characteristics, such as type of deployed fiber and presence of amplification noise, limit the values achievable in practice to a few times the spectral efficiency carried by today 50 GHz dense DWDM networks with 100 Gbit/s channels, that is approximately 2 bit/s/Hz. It is also known to provide adaptive super-channels, with optimising of sub-channel bandwidth and spacing according to OSNR.

SUMMARY

Embodiments of the invention provide improved methods and apparatus. According to a first aspect of the invention, there is provided apparatus for controlling parameters of an optical multi carrier signal having a modulation format and comprising a plurality of individual carrier signals, the apparatus having an input for receiving an indication of individual carrier transmission performance of at least one of the individual carrier signals. A processor is provided for selecting parameter values for said at least one of the individual carrier signals, the parameter values comprising both a carrier Forward Error Correction (FEC) overhead and a carrier bandwidth for the modulation format, according to the indicated individual carrier transmission performance and according to a resulting overall spectral efficiency of the optical multi carrier signal. The said selected parameter values are output for control of the optical multi carrier signal.

By selecting both of these two parameters rather than either one, better optimisation can be obtained since they are interdependent factors. Carrier bandwidth control can give better granularity than changing modulation format for example. By adapting according to overall spectral efficiency, the transmitter can make better use of bandwidth or improve the overall capacity for example. See FIG. 1 or 2 for example.

Carrier bandwidth is here defined as encompassing bandwidth with any guardband or bandwidth without any guardband, or in cases of overlap between adjacent carriers then it can encompass bandwidth including such overlap, or bandwidth up to a midpoint of the overlap. In this latter case, the carrier bandwidth would be controlled whenever the carrier spacing is controlled.

Adapting carrier bandwidth can encompass for example controlling a mapping to adapt a rate of data modulated onto the carrier, controlling a digital filter before electrical to optical conversion in a modulator, tuning a laser to control a frequency spacing between carriers, or adapting an optical band filter after electrical to optical conversion. Determining both parameters can encompass determining them simultaneously from look up tables for example, or adapting one then the other in a sequential iterative process for example. The determination of these parameters can give more scope for improved efficiency with lower order modulation formats as there is typically greater spacing between carriers.

Any additional features can be added to any of the aspects, and some such additional features are set out below. One such additional feature is the processor being configured to select carrier bandwidth for said at least one of the carriers of the multi carrier signal to provide faster than Nyquist operation.

One such additional feature is the processor being configured to select a carrier spacing according to the indicated individual carrier transmission performance and according to the resulting overall spectral efficiency of the optical multi carrier signal.

Another such additional feature is the processor being configured to receive an indication of a desired total bandwidth limit for the multi carrier signal, and to make the selections of carrier FEC overhead and carrier bandwidth according to that total bandwidth limit. Note that overall spectral efficiency is directly related to overall bandwidth and overall capacity so that if one is constrained, the other two are exact equivalents.

Another such additional feature is the processor being configured to receive an indication of a desired total transmission capacity for the multi carrier signal and to make the selections of carrier FEC overhead and the carrier bandwidth according to that total transmission capacity.

Another such additional feature is the processor also being configured to control a mapper, to adapt a mapping of payload onto different ones of the carriers according to the selected parameter values.

Another such additional feature is a look up table having possible values of carrier FEC overhead as a function of possible values of corresponding carrier bandwidth and the indicated corresponding carrier transmission performance, and having possible values of corresponding carrier bandwidth as a function of possible values of carrier FEC overhead and the indicated corresponding carrier transmission performance.

Another such additional feature is, the processor being configured to determine an overall spectral efficiency achieved by respective different combinations of possible values of carrier FEC overhead and corresponding carrier bandwidth from the look up table, and configured to make the selections of carrier FEC overhead and carrier bandwidth by selecting from the different combinations according to the determined overall spectral efficiencies.

Another such additional feature is the processor being configured to update the selection of parameter values periodically.

Another such additional feature is a network management system having the apparatus set out above.

Another aspect provides a method of controlling parameters of an optical multi carrier signal having a modulation format and comprising a plurality of individual carrier signals, involving receiving an indication of individual carrier transmission performance of at least one of the individual carrier signals, and selecting parameter values for said at least one of the individual carrier signals. The parameter values comprise both a carrier FEC overhead and a carrier bandwidth for the modulation format, according to the indicated individual carrier transmission performance and according to an overall spectral efficiency of the multi carrier signal, and the said selected parameter values are output for control of the optical multi carrier signal.

Another such additional feature of the method is the carrier bandwidth being selected to provide faster than Nyquist operation. This can enable greater spectral efficiency if the increased data rate outweighs an increase in FEC overhead or other coding to overcome transmission errors from the ISI or ICI caused by the faster than Nyquist operation. By combining this with dynamic adaptation according to the per carrier transmission performance, the spectral efficiency can be further improved. See FIG. 4 for example.

Another such additional feature is selecting a carrier spacing according to the indicated individual carrier transmission performance and according to the resulting overall spectral efficiency of the optical multi carrier signal.

Another such additional feature is receiving an indication of a desired total bandwidth limit for the multi carrier signal, and the selecting step being carried out according to that total bandwidth limit. This adds a constraint which makes the determination easier and reflects a realistic situation. With a fixed total bandwidth, calculating the spectral efficiency is effectively equivalent to calculating the total transmission capacity. See FIG. 5 for example.

Another such additional feature is receiving an indication of a desired total transmission capacity for the multi carrier signal and the selecting step being carried out according to that total transmission capacity. This is an alternative constraint which makes the determination easier and reflects a realistic situation. With a fixed total capacity, calculating the spectral efficiency is effectively equivalent to calculating the total bandwidth. Such constraints can be derived from physical equipment limitations or set by network management or data related for example. See FIG. 6 for example Another such additional feature is adapting a mapping of payload onto different ones of the carriers according to the selected parameter values. This can encompass adapting which carriers are used, adapting a number of carriers used, adapting a data rate of each carrier, or adapting spacings of the carriers for example. See FIG. 7 for example.

Another such additional feature is using a look up table to determine possible values of carrier FEC overhead as a function of possible values of corresponding carrier bandwidth and the indicated corresponding carrier transmission performance, and to determine possible values of corresponding carrier bandwidth as a function of possible values of carrier FEC overhead and the indicated corresponding carrier transmission performance. This is one way to implement the adaptation. See FIG. 8 for example.

Another such additional feature is determining an overall spectral efficiency achieved by respective different combinations of possible values of carrier FEC overhead and corresponding carrier bandwidth, and making the selections by selecting from the different combinations according to their respective overall spectral efficiencies. See FIG. 8 for example.

Another such additional feature is updating the selection of parameter values periodically.

Another aspect provides a computer program stored on a computer readable medium and having instructions which when executed by a processor can cause the processor to carry out the method as set out above.

Any of the additional features can be combined together and combined with any of the aspects. Other effects and consequences will be apparent to those skilled in the art, especially compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
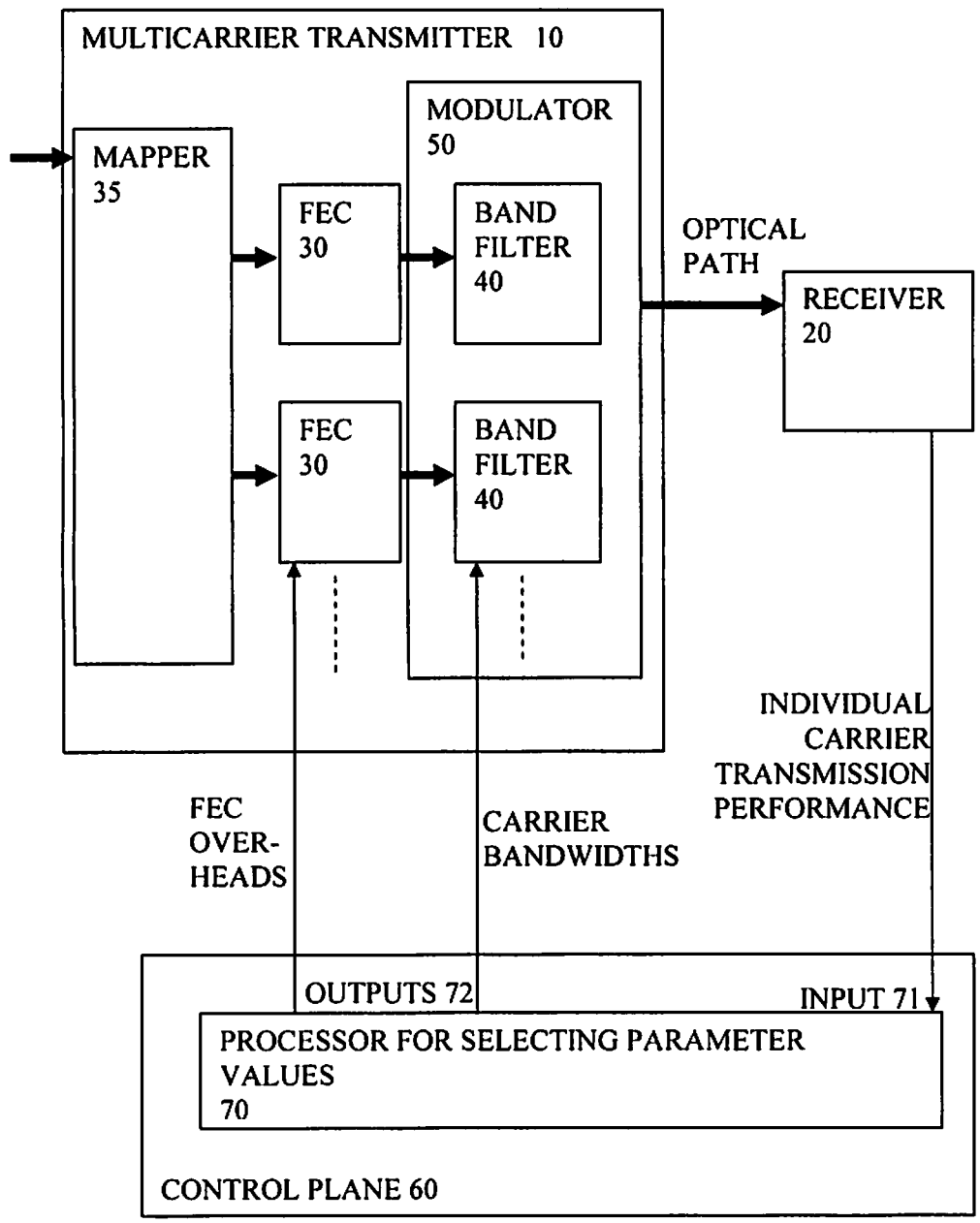
FIG. 1 shows a schematic view of apparatus according to an embodiment for transmitting an optical multicarrier signal with control of parameter values.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Definitions:

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described apparatus, nodes networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to faster than Nyquist are intended to encompass any multicarrier scheme achieving faster signaling than that predicted by the Nyquist rule for a given channel spacing/bandwidth occupation. This can involve having frequency overlap of adjacent carriers and corresponding processing at the receiver to compensate for the degradation from the overlap, or can be obtained even without overlap by tight filtering and reduced channel spacing.

Abbreviations:
BV-OXC: bandwidth variable optical cross-connect
DP-QPSK: dual polarization quadrature phase shift keying
FTN: Faster than Nyquist
OFDM: Orthogonal frequency division multiplexed
QAM: quadrature amplitude modulation
PCE: Path Computation Element
WSON: wavelength switched optical network Introduction By way of introduction to the embodiments, how they address some issues with conventional designs will be explained.

Orthogonal signaling is implicitly assumed in many of the proposed techniques for spectrally efficient transmission, e.g. orthogonal frequency division multiplexing (OFDM). Orthogonal signaling ensures absence of intersymbol (ISI) and interchannel interference (ICI). In a typical case, in order to lower the processing speed, different subchannels are used, spaced apart in frequency by F and each employing an M-ary modulation format with symbol interval T. OFDM is an alternative technique which allows for overlapping channels making use of rectangular pulses of duration T, with F=1/T. In both the cases, in the absence of ISI and ICI and for high signal-to-noise ratio (SNR), the maximum obtainable spectral efficiency is $\eta=\log 2M$. This means that better efficiencies are achievable only by using high order modulations. This may be a problem as, in order to maintain a given performance, it requires a proportional increase of SNR and channel power, which may not be feasible due to fiber nonlinearities. (Note that reference to a sub channel is regarded as implying part of super channel but reference to a carrier may imply either part of a super channel, or part of any type of multicarrier signal.)

However, spectral efficiency can also be increased without increasing M. Indeed, from information theory, $\eta=IM/(FT)$, where IM is the average mutual information between input and output and, under the orthogonality condition, its maximum value is log 2M. Giving up the orthogonality condition is equivalent to assuming FT<1: as a consequence, the maximum value of IM decreases but it may happen that IM/(FT) actually increases. An example is a quadrature phase shift keying (QPSK) system employing a raised root cosine (RRC) pulse with roll-off a=0.2. In this example, for the Nyquist symbol time $T=T_0$, $\eta=1.66$ bit/s/Hz, while $\eta$ reaches a maximum of about 3 bit/s/Hz for $T=0.4T_0$, even if the mutual information decreases from 2 to about 1.5 bit/symbol.

Faster than Nyquist (FTN)

There are several flavours of non-orthogonal transmission. For example, Faster-than-Nyquist signaling is a known technique consisting of sending pulse trains that typically overlap both in time and frequency. The optimal time and frequency spacings are obtained as the smallest values giving no reduction of the minimum Euclidean distance with respect to the Nyquist case. In practice, no performance degradation is experienced with respect to the orthogonal case, at least when the optimal detector is adopted. However, the complexity of the optimal detector easily becomes unmanageable, so it is not currently practical to achieve this optimization with practical receivers. A similar approach is considered in A. Barbieri, D. Fertonani, and G. Colavolpe, "Time-frequency packing for linear modulations: spectral efficiency and practical detection schemes," IEEE Trans. Commun., vol. 57, pp. 2951-2959, October 2009.

However, rather than decreasing time and frequency spacings to preserve the minimum distance, they are chosen to maximize the spectral efficiency in presence of a constrained-complexity receiver, independent of the interference set size.

A practical way to achieve Faster-than-Nyquist transmission is to narrow filter a complex modulated signal, e.g. QPSK, so that the transmitted pulses overlap in time. The spectral efficiency improves because of the reduced bandwidth occupancy of the transmitted signal, which, in turn, enables a reduction in the frequency spacing F between channels without necessarily letting them overlap in frequency. In a sub-optimal but practical implementation, each subchannel can be individually sampled and processed, in order to guarantee system modularity. The distortion introduced by the filter can be recovered by proper post-processing at the receiver. This is in agreement with the Shannon theory, which ensures that the spectral efficiency of a communication system can be improved by giving up the orthogonality condition, at least when low-order constellations are considered. Also in this case, practical reduced-complexity detectors can be used, with the additional advantage that low-order constellations, such as QPSK, are easy to generate and decode. From now on, this kind of Faster than Nyquist transmission technique will be referred to as frequency packing (FP).

The post-processing DSP can make use of a two dimensional (2-D) adaptive FFE with 9 taps for example, to process the signals received on two orthogonal states of polarization to compensate for chromatic dispersion and PMD, so that its output is provided to a BCJR detector which iteratively exchanges information with the decoder for a maximum of 100 iterations.

Frequency Packing is an example of a super-channel implementation that can rely on adaptive FEC. Frequency packed channels typically use a low order modulation format, typically QPSK. Rather than increasing the modulation constellation size, spectral efficiency is achieved by narrow filtering the modulated carriers so that their frequency separation can be reduced accordingly. At the receiver, a turbo-equalization structure recovers both filtering and propagation impairments. The capability to individually set a type of FEC code for each sub-channel of a frequency packed super-channel can lead to a significant increase of the transmission capacity.

Combined with the flexible grid, adaptive transceivers are the other tool to enhance the network flexibility. In adaptive transceivers, the format of the transmitted signal is adapted according to target link distance and available spectrum. At this purpose, it is possible to act on several design parameters: number of subchannels in a superchannel, subchannel bit rate and modulation format, type of FEC, etc. For example, a 16QAM transmitter can easily be used also for QPSK transmission, halving the line rate but allowing much longer link distances. This solution is likely to be implemented for 400 Gbit/s channels based on two DP-16QAM carriers because it can rely on same electronics developed for 100 Gbit/s systems and leads to a small increase of DSP complexity.

Using adaptive modulation formats as a tool to adjust the capacity has two drawbacks: coarse granularity and hardware complexity. For example, switching from 16QAM to QPSK can lead to halving the transmitted capacity and requires a modulator able to generate both the formats.

On the other hand, adaptive FEC allows finer capacity steps and can entirely be managed at the DSP level, e.g. by means of puncturing techniques. For instance, a FEC code rate could vary in the range 9/10, 8/9, 4/5, 3/4 and 2/3 keeping constant the bit rate in line, including overhead and payload.

Figure 2:
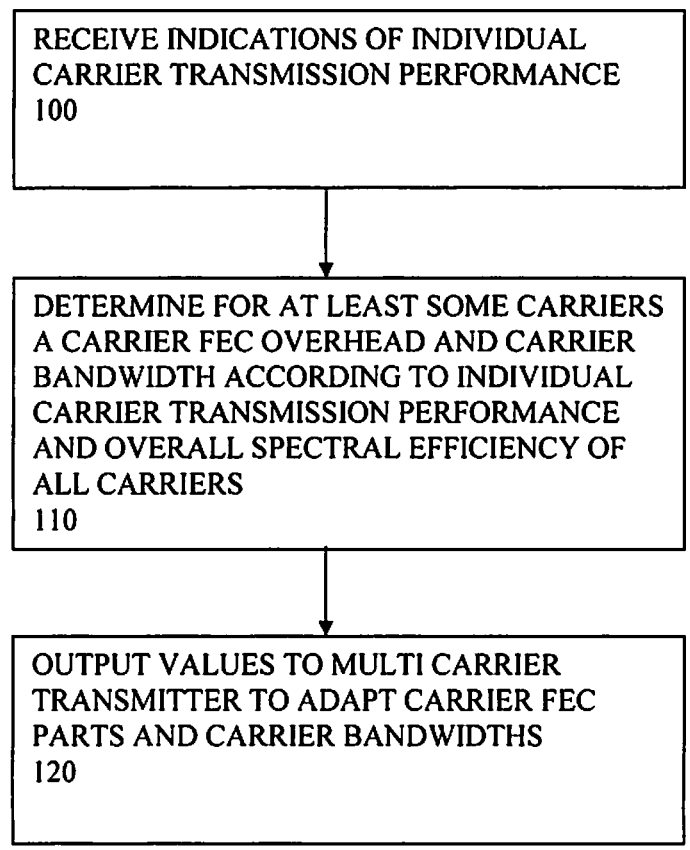
FIG. 2 shows operational steps according to an embodiment.

FIGS. 1, 2, a First Embodiment

FIG. 1 shows a schematic view of apparatus according to an embodiment for transmitting an optical multicarrier signal with control of parameter values. A multicarrier transmitter 10 is configured to send an optical multicarrier signal over an optical path to a receiver 20 as shown. A processor 70 for selecting parameter values for the transmitter is shown as part of a control plane 60 for example. Transmission performance of individual carriers of the multicarrier signal is detected at the receiver and fed back to inputs 71 of the processor. The processor also has outputs 72 coupled to the transmitter to send parameter values such as FEC overheads and carrier bandwidths to the transmitter to enable the multicarrier signal to be adjusted to achieve optimum spectral efficiency for example. The FEC overheads can be in the form of FEC lengths or proportions relative to payload for example.

The transmitter can have a mapper 35 for mapping the payload to a number of data streams each for separate carriers of the multicarrier signal. Each data stream passes to its own FEC part 30 which is adaptive and adapts the length of FEC overhead used according to the respective FEC overhead value from the processor. The resulting data streams with FEC overhead are each passed to the modulator 50 for producing modulated optical carriers which are fed to the same optical path for transmission together as the multicarrier signal to the receiver. The modulator can in some examples produce a multicarrier signal, or a separate wavelength division multiplexer can be provided for multiplexing the carriers together. Band filters 40 are shown as an example of how to control carrier bandwidth of each carrier individually according to the carrier bandwidth parameter output by the processor. These can in principle be digital filters for filtering a bandwidth of the data stream at the input of the modulator, or optical bandfilters for band filtering the optical carriers individually before they are multiplexed.

FIG. 2 shows operational steps of the embodiment of FIG. 1 or other embodiments. At step 100, indications of individual carrier transmission performance are received at the processor, from the receiver. At step 110, the processor determines for each carrier, or at least some of the carriers, or for a group of the carriers, parameter values such as a carrier FEC overhead, and carrier bandwidth according to the individual carrier transmission performance and according to an overall spectral efficiency of all carriers. Some examples of how to implement this will be explained in more detail below. At step 120, these parameter values are output to the transmitter to adapt the carrier FEC parts and adapt the carrier bandwidths, to tune the multicarrier signal more finely to the current transmission conditions. The operation and advantages can apply whether the multi carrier signal has one modulation format for all carriers or a mixture of different formats for different ones of the carriers. Note that the operation can be repeated periodically according to how fast transmission conditions may change, to enable dynamic adaptation rather than merely setting up parameters during installation or commissioning.

Figure 3:
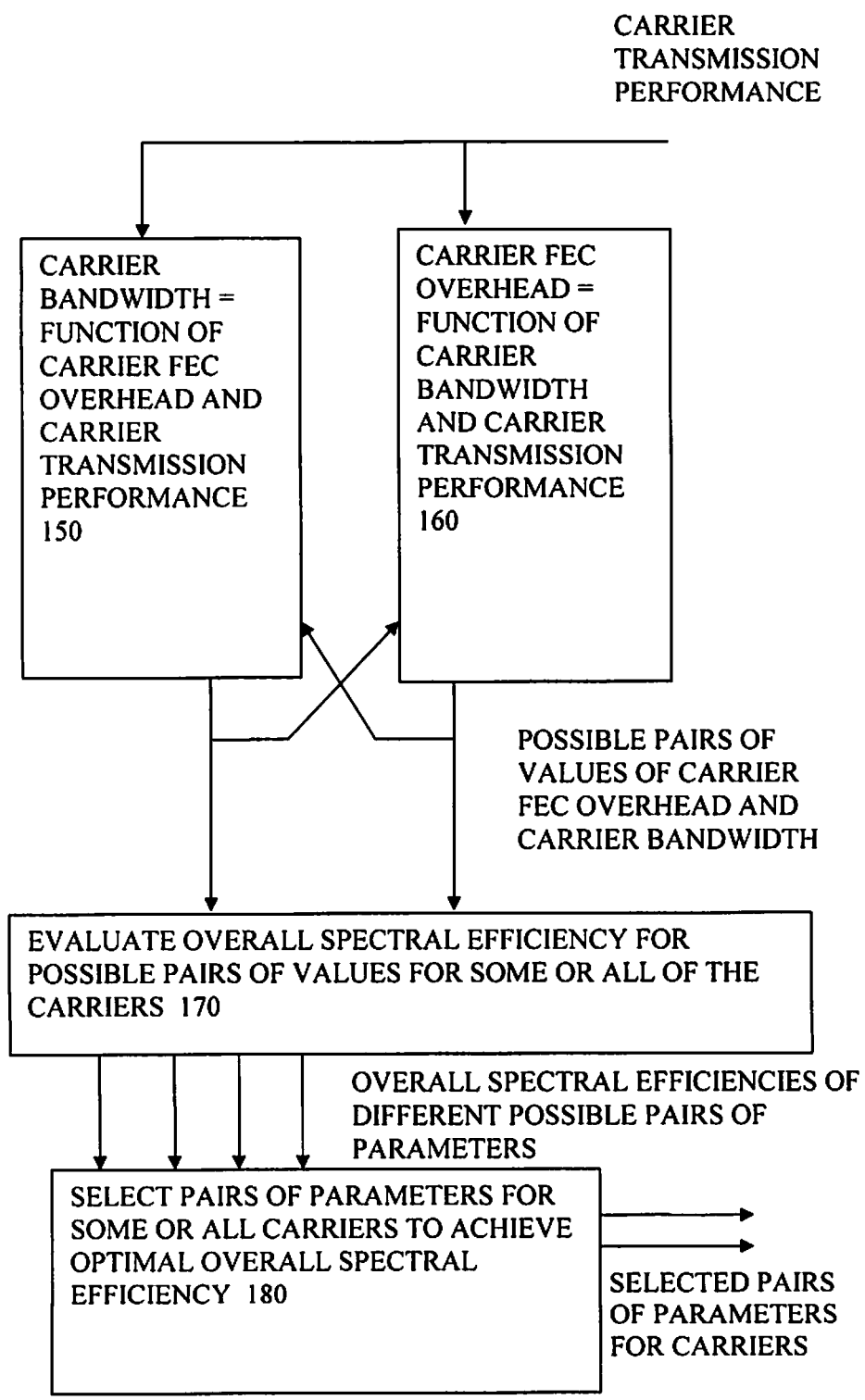
FIG. 3 shows a schematic diagram of processing to select parameter values.

FIG. 3, Schematic Diagram of Processing to Select Parameter Values

FIG. 3 shows a schematic diagram of processing steps involved in selecting parameter values according to an embodiment. At step 150, carrier bandwidth is determined as a function of carrier FEC overhead and carrier transmission performance. At step 160, carrier FEC overhead is determined as a function of carrier bandwidth and carrier transmission performance. Possible pairs of values of carrier FEC overhead and carrier bandwidth are passed on to step 170 where an overall spectral efficiency is determined for each possible pair of values. At step 180 a pair of parameters is selected for each of some or all of the carriers based on the resulting overall spectral efficiencies, and optionally based on other factors. The selected pairs of parameters are output to the multicarrier transmitter to cause it to output a modified multicarrier signal.

More Detailed Example of Processing to Select Parameters
Nomenclature:

$R_C$ Client aggregate throughput in bit/s, as given by the sum of the M input data flows $R_L$ WDM line aggregate throughput in bit/s, as given by the sum of the N carriers $R^{(n)}$ Bit rate, including FEC overhead and payload, of n-th carrier (n=1, . . . , N)

We suppose K different types of FEC are available with overhead $\alpha_k$, k=1, . . . , K. FEC overhead and correction capability are assumed to increase/decrease with k, respectively.

$\alpha_k^{(n)}$ means the n-th carrier uses the k-th type of FEC.

The following relation holds:

$$R_c \leq \sum_{n=1}^{N} \frac{R_n}{1+\alpha^{(n)}} \qquad \text{(Equation 1)}$$

Its meaning is the tributary payload cannot be higher than the output one, t sent into the WDM line.

$B^{(n)}$ n-Th Carrier Bandwidth

We suppose $B^{(n)}$ can assume L different discrete values with a certain granularity (e.g. 6.25 GHz according to the flexible grid)

$B_l^{(n)}$ means the l-th carrier equal the l-th value.

SE spectral efficiency, in bit/s/Hz, defined as the ratio between transmitted information ratio and aggregate bandwidth.

$$SE = \frac{\sum_{n=1}^{N} \frac{R^{(n)}}{1+\alpha^{(n)}}}{\sum_{n=1}^{N} B^{(n)}} \quad \text{(Equation 2)}$$

In the following, we will assume $R^{(n)}=R$ for all the carriers so that $$SE = \frac{R \cdot \sum_{n=1}^{N} \frac{1}{1+\alpha^{(n)}}}{\sum_{n=1}^{N} B^{(n)}} \quad \text{(Equation 3)}$$

Relation Between FEC Overhead, Bandwidth and OSNR

As pointed out above, optimal FEC overhead and carrier bandwidth are mutually dependent variables because lower bandwidths require higher FEC overhead to compensate for the increased filtering penalty. Of course, the FEC overhead also depends on the carrier transmission performance, represented for example by OSNR accumulated along the optical path due to the amplification noise: the lower the OSNR, the higher the overhead.

$$\alpha^{(n)} = f(B^{(n)}, OSNR^{(n)}) \quad \text{(Equation 4)}$$

Where f( ) is monotonically decreasing function of both bandwidth and OSNR so that it can be inverted.

$$B^{(n)} = f^{-1}(\alpha^{(n)}, OSNR^{(n)}) \quad \text{(Equation 5)}$$

Both $\alpha^{(n)}$ and $B^{(n)}$ vary over a finite discrete set of values. Similarly, the OSNR can be discretized within practical lower and upper bound values, so that the functions in Equations 4 and 5 are easily implementable by means of look up tables.

In some cases the measured OSNR may not be available in field. Also although the performance is primarily determined by the OSNR, it is not the only relevant parameter but other propagation effects, such as fiber non-linearities, could significantly contribute. Furthermore manufacturing tolerances could also be important. A practical way to solve these issues is using an equivalent OSNR value, calculating starting from a measured BER value through a BER vs. OSNR curve which characterizes the FEC behavior. In the following, we will continue to refer to OSNR for sake of simplicity.

Figure 4:
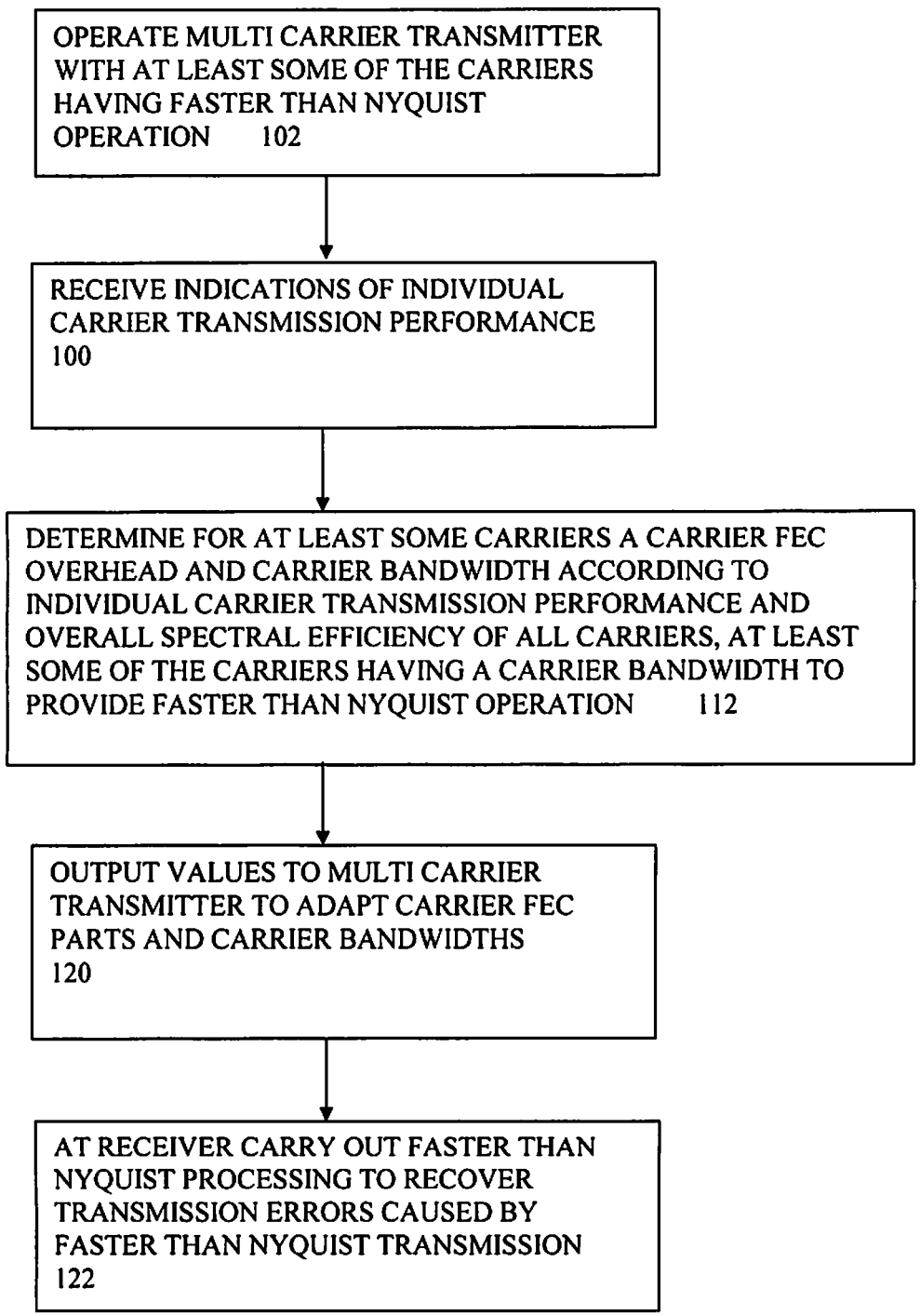
FIG. 4 shows a further embodiment using FTN.

FIG. 4, a Further Embodiment Using FTN

In frequency packing based transmitters, and other multicarrier types, it is possible to vary the carrier bandwidth, by means of electrical or optical variable filters, or both: higher bandwidth values correspond to lower spectral efficiency and better performance and vice versa for lower bandwidths. The possibility to adjust the bandwidth is beneficial especially for the next generation of systems based on the flexible grid, recently standardized by ITU-T in the G.694.1 recommendation. These systems allow dynamic allocation of the optical bandwidth according to the actual traffic load and the performance achieved on each optical path. However, setting optimal FEC overhead and carrier bandwidth values in a frequency packed super-channel for example, is not a trivial task because these are interdependent values: ideally, it would be desirable to keep both the values as low as possible to maximize the spectral efficiency (i.e. maximizing the payload and minimizing the transmission bandwidth) but this is not possible because lower bandwidth requires higher FEC overhead to compensate for the increased filtering penalty.

Some embodiments assume an optical interface based on Faster than Nyquist operation, and use FEC and optical bandwidths setting methods to maximize the capacity of an optical super-channel compatibly with the propagation impairments introduced by the optical path. FIG. 4 shows an example similar to that of FIG. 2, but with a step 102 of operating the multicarrier transmitter with at least some of the carriers having faster than nyquist operation. At step 100, indications of individual carrier transmission performance are received at the processor, from the receiver. At step 112, the processor determines for each carrier, or at least some of the carriers, or for a group of the carriers, parameter values such as a carrier FEC overhead, and carrier bandwidth according to the individual carrier transmission performance, (bearing in mind that some or all of the carriers will have faster than Nyquist operation), and according to an overall spectral efficiency of all carriers. At step 120, these parameter values are output to the transmitter to adapt the carrier FEC parts and adapt the carrier bandwidths, Once the two values have been calculated, a notification can be sent to a) the client interface so that it can adjust the rates of the tributary data flows, b) the M:N mapper so that it can accordingly set the payload on each carrier, and c) a control and management plane so it can have a complete view of allocated and available resources.

Some embodiments enable maximizing of the transmitted capacity over a given bandwidth, and others enable minimizing of the bandwidth for a given transmission capacity. This can help ensure that available network resources are efficiently exploited, as will now be explained.

Figure 5:
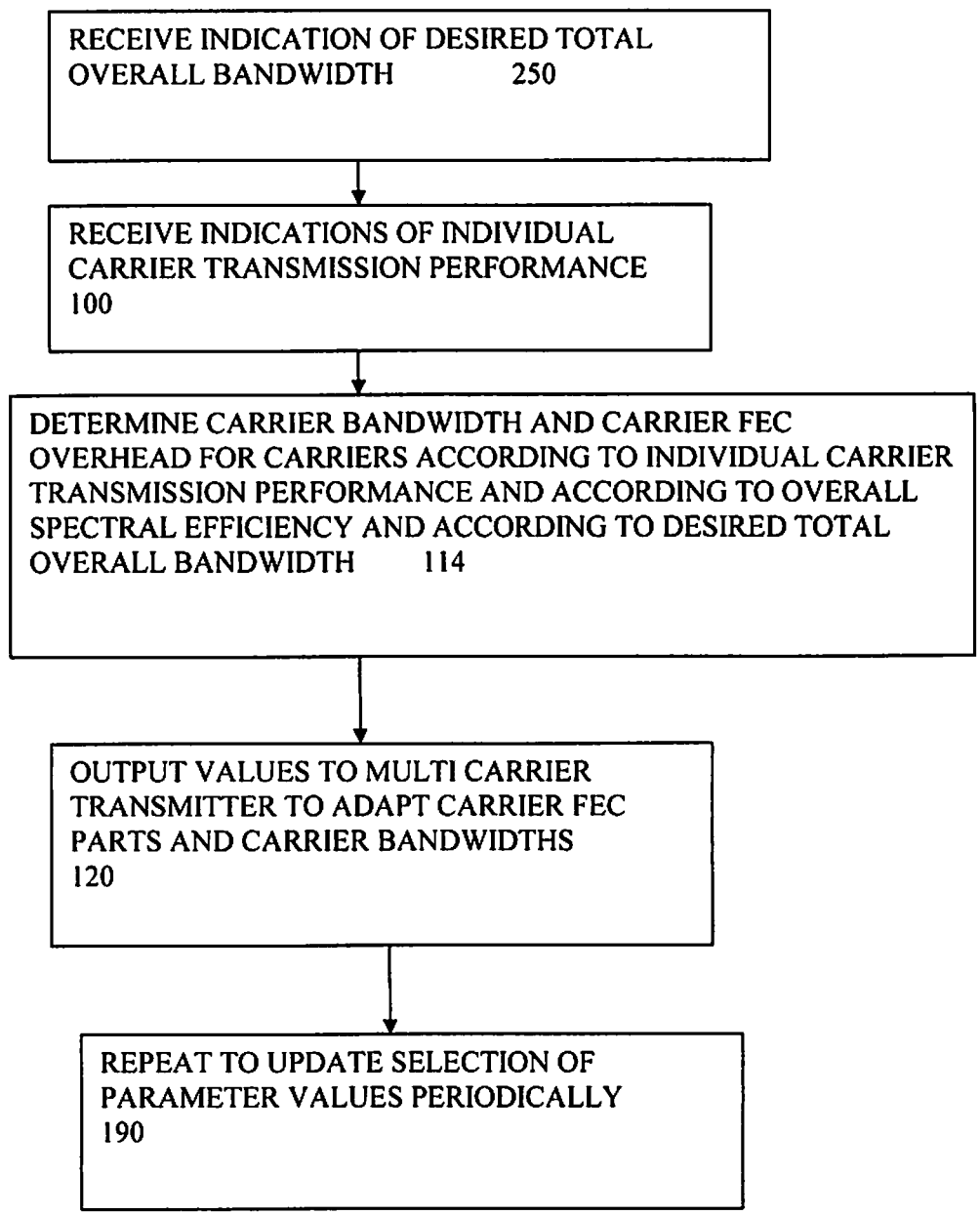
FIG. 5 shows a further embodiment with capacity maximization over a given bandwidth.

FIG. 5, Capacity Maximization Over a Given Bandwidth

To maximize the transmission capacity over a given bandwidth $B_{TOT}$, it is convenient to rewrite Equation 3 as follows.

$$SE = \frac{R \cdot \sum_{n=1}^{N} \frac{1}{1+\alpha^{(n)}}}{\sum_{n=1}^{N} f^{-1}(\alpha^{(n)}, OSNR^{(n)})} \quad \text{(Equation 6)}$$

The task can be solved by means of linear programming techniques, minimizing Equation 6 with respect to $\alpha^{(1)}, \alpha^{(N)}$ with the constraint $$\sum_{n=1}^{N} B^{(n)} = B_T \quad \text{(Equation 7)}$$

$OSNR^{(n)}$ are either directly measured or derived by measured BER, as explained above. FIG. 5 shows steps of an example based on the example of FIG. 2. At step 250 an indication of a desired total overall bandwidth is received. At step 100, indications of individual carrier transmission performance are received at the processor, from the receiver. At step 114, the processor determines for each carrier, or at least some of the carriers, or for a group of the carriers, parameter values such as a carrier FEC overhead, and carrier bandwidth according to the individual carrier transmission performance and according to an overall spectral efficiency of all carriers and according to the desired total overall bandwidth. At step 120, these parameter values are output to the transmitter to adapt the carrier FEC parts and adapt the carrier bandwidths, to tune the multicarrier signal more finely to the current transmission conditions. In any of the embodiments the selection of parameter values can be repeated periodically as shown in step 190.

Figure 6:
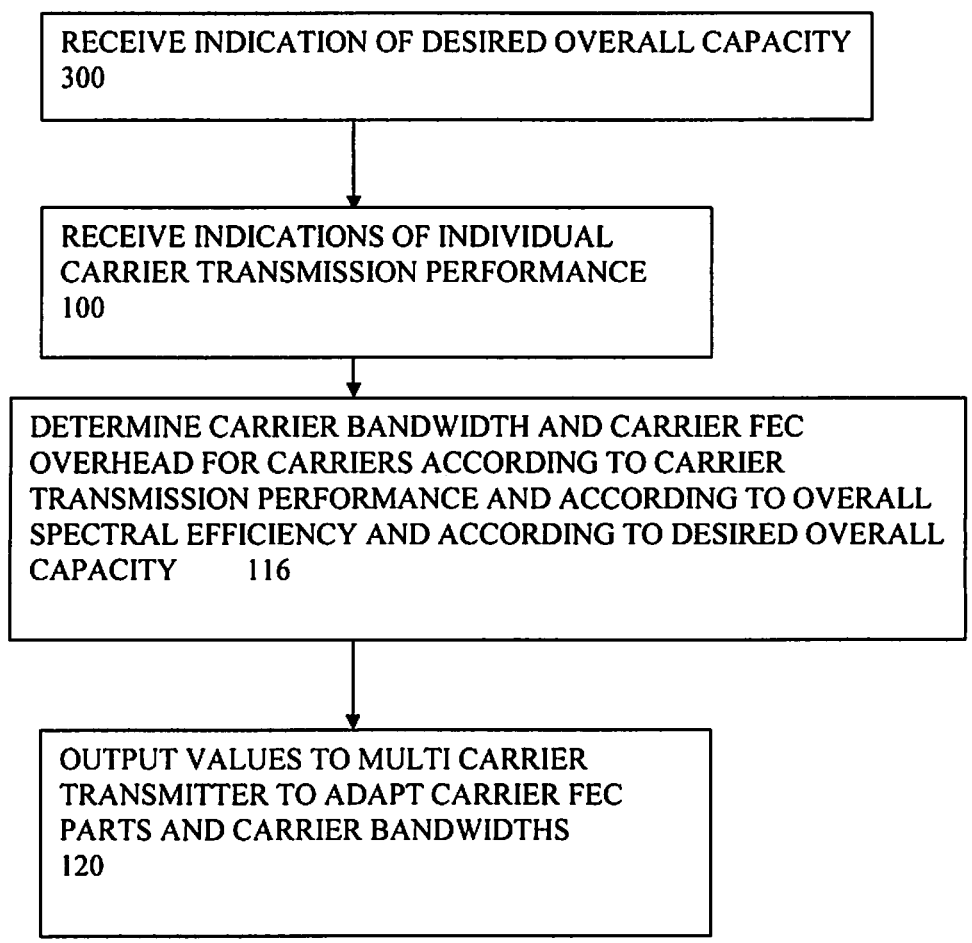
FIG. 6 shows a further embodiment with bandwidth minimization for a given capacity.

FIG. 6, Bandwidth Minimization for a Given Capacity

To minimize the bandwidth for a given transmission capacity $C_{TOT}$, it is convenient to rewrite Equation 3 as follows.

$$SE = \frac{R \cdot \sum_{n=1}^{N} \frac{1}{1 + f(B^{(n)}, OSNR^{(n)})}}{\sum_{n=1}^{N} B^{(n)}} \quad \text{(Equation 8)}$$

The task can be solved by means of linear programming techniques, minimizing Equation 6 with respect to $B^{(1)}, \ldots, B^{(N)}$ with the constraint $$R \cdot \sum_{n=1}^{N} \frac{1}{1 + f(B^{(n)}, OSNR^{(n)})} = C_T \quad \text{(Equation 9)}$$

$OSNR^{(n)}$ are either directly measured or derived by measured BER, as explained above. FIG. 6 shows steps of an example based on the example of FIG. 2. At step 300 an indication of a desired overall capacity is received. At step 100, indications of individual carrier transmission performance are received at the processor, from the receiver. At step 116, the processor determines for each carrier, or at least some of the carriers, or for a group of the carriers, parameter values such as a carrier FEC overhead, and carrier bandwidth according to the individual carrier transmission performance and according to an overall spectral efficiency of all carriers and according to the desired overall capacity. At step 120, these parameter values are output to the transmitter to adapt the carrier FEC parts and adapt the carrier bandwidths, to tune the multicarrier signal.

Figure 7:
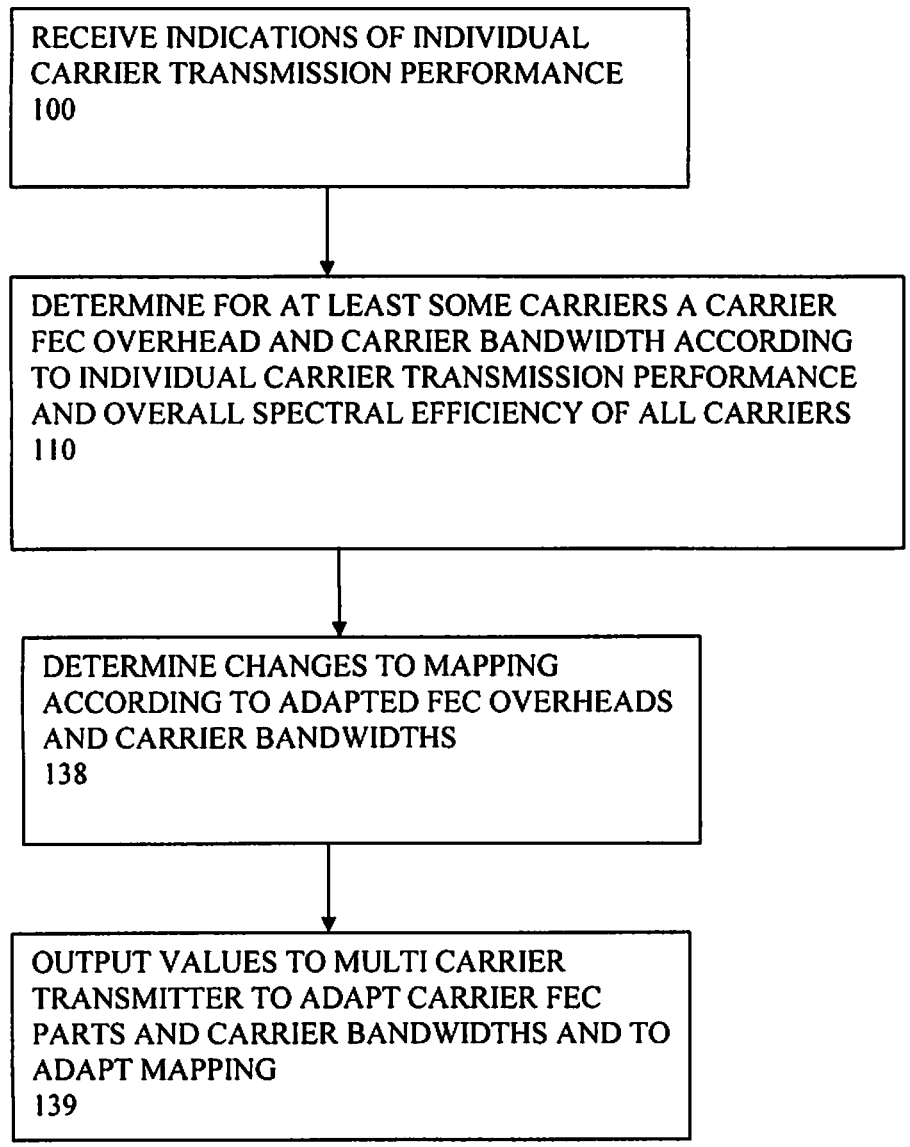
FIG. 7 shows a further embodiment with mapping changes.

FIG. 7, Example with Mapping Changes

FIG. 7 shows an example similar to that of FIG. 2, with a corresponding step 100, in which indications of individual carrier transmission performance are received at the processor, from the receiver. At step 110, the processor determines for each carrier, or at least some of the carriers, or for a group of the carriers, parameter values such as a carrier FEC overhead, and carrier bandwidth according to the individual carrier transmission performance and according to an overall spectral efficiency of all carriers. At step 138, there is a step of determining changes to the mapping according to the new parameter values for FEC overheads and carrier bandwidths. At step 139, these parameter values are output to the transmitter to adapt the carrier FEC parts and adapt the carrier bandwidths, to tune the multicarrier signal, and to adapt the mapping.

Figure 8:
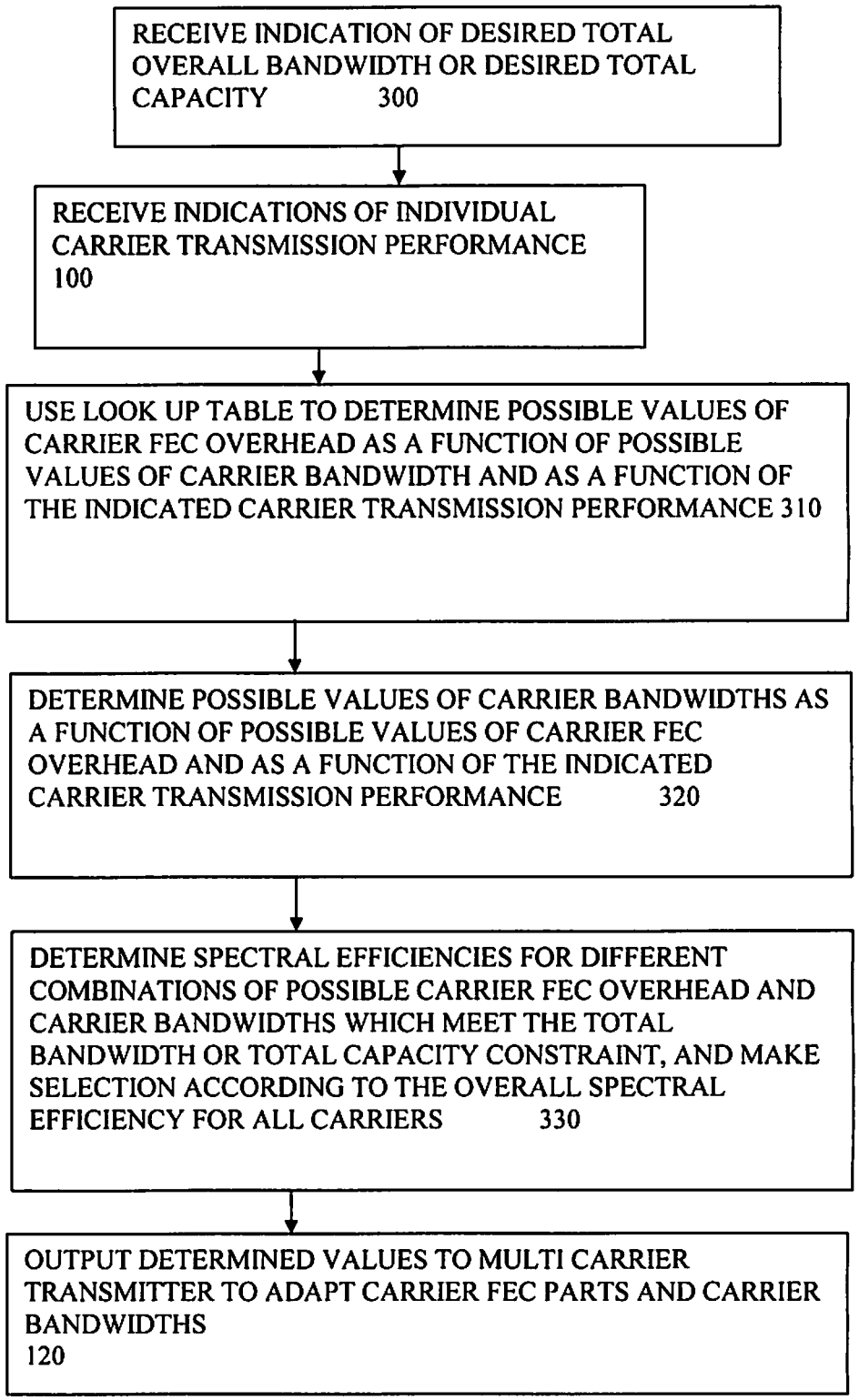
FIG. 8 shows a further embodiment using look up tables.

FIG. 8, Example Using Look Up Tables

FIG. 8 shows another example similar to that of FIG. 2, in which at step 300, indications of desired total bandwidth or total capacity are received at the processor, then at step 100, indications of individual carrier transmission performance are received at the processor, from the receiver. At step 310, a look up table is used to determine possible values of carrier FEC overheads as a function of possible values of carrier bandwidth and as a function of the indicated carrier transmission performance. At step 320, possible values of carrier bandwidths are determined, optionally by look up table, as a function of carrier FEC overhead and as a function of the indicated carrier transmission performance. At step 330, there is a step of determining spectral efficiencies for different combinations of possible carrier FEC overhead and carrier bandwidths which meet the total bandwidth or total capacity constraint. The selection of which values to use is then made according to at least the resulting overall spectral efficiency. At step 120, these selected parameter values are output to the transmitter to adapt the carrier FEC parts and adapt the carrier bandwidths, to tune the multicarrier signal.

Figure 9:
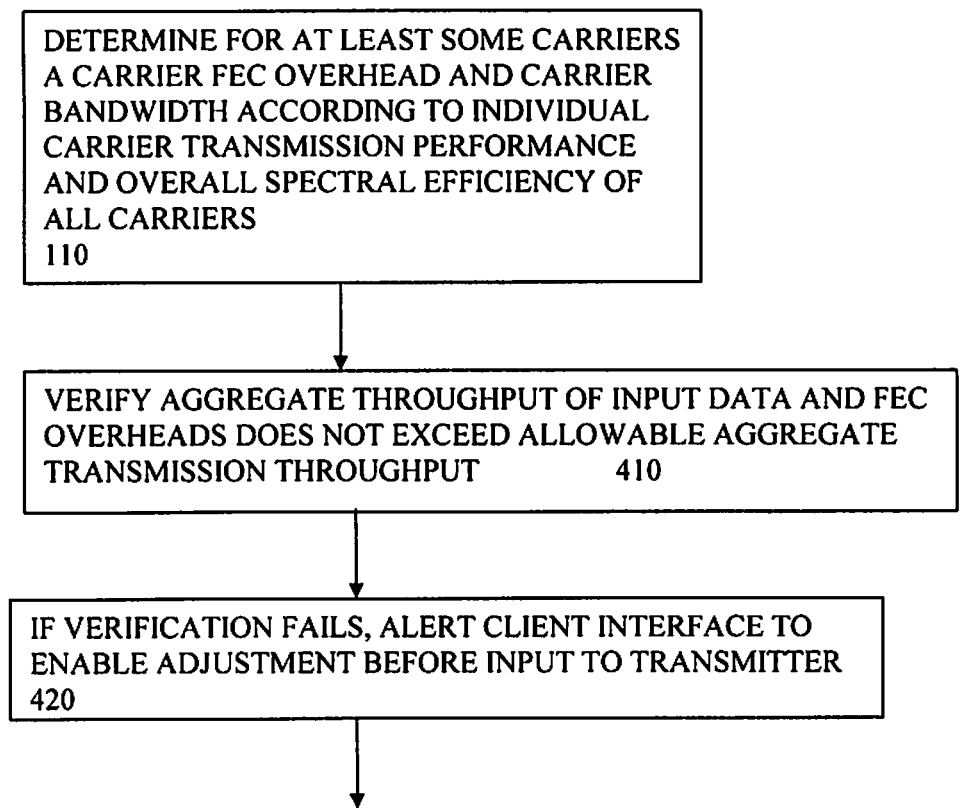
FIG. 9 shows a further embodiment with verification.

FIG. 9 Example with Verification

FIG. 9 shows an example with verification steps following the selection of parameters. At step 110 as in FIG. 2, there is a step 110 in which the processor determines for each carrier, or at least some of the carriers, or for a group of the carriers, parameter values such as a carrier FEC overhead, and carrier bandwidth according to the individual carrier transmission performance and according to an overall spectral efficiency of all carriers. Then at step 410, there is a step of verifying the aggregate throughput of payload data and FEC overheads does not exceed the allowable aggregation throughput. Once FEC overheads have been calculated, their consistency must be checked by means of Equation 1. If it is verified, no action is required; otherwise a client interface should be notified as in step 420, to enable adjustment before the payload reaches the input to the transmitter.

Two actions are possible which can be alternatives or can be combined.

1) Notify the client interface so that it can reduce the aggregate bit rate $R_C$ to meet Equation 1 is satisfied and $$R_{Cnew} = R \sum_{n=1}^{N} \frac{1}{1 + \alpha^{(n)}}$$

2) Equivalently, notify the client interface so that it can put idle bits in known positions so that the usual payload bit rate still meet equation 1. The idle bits are discharged by the M:N mapper, so that the actual data rate is reduced before the FEC overhead is added.

Figure 10:
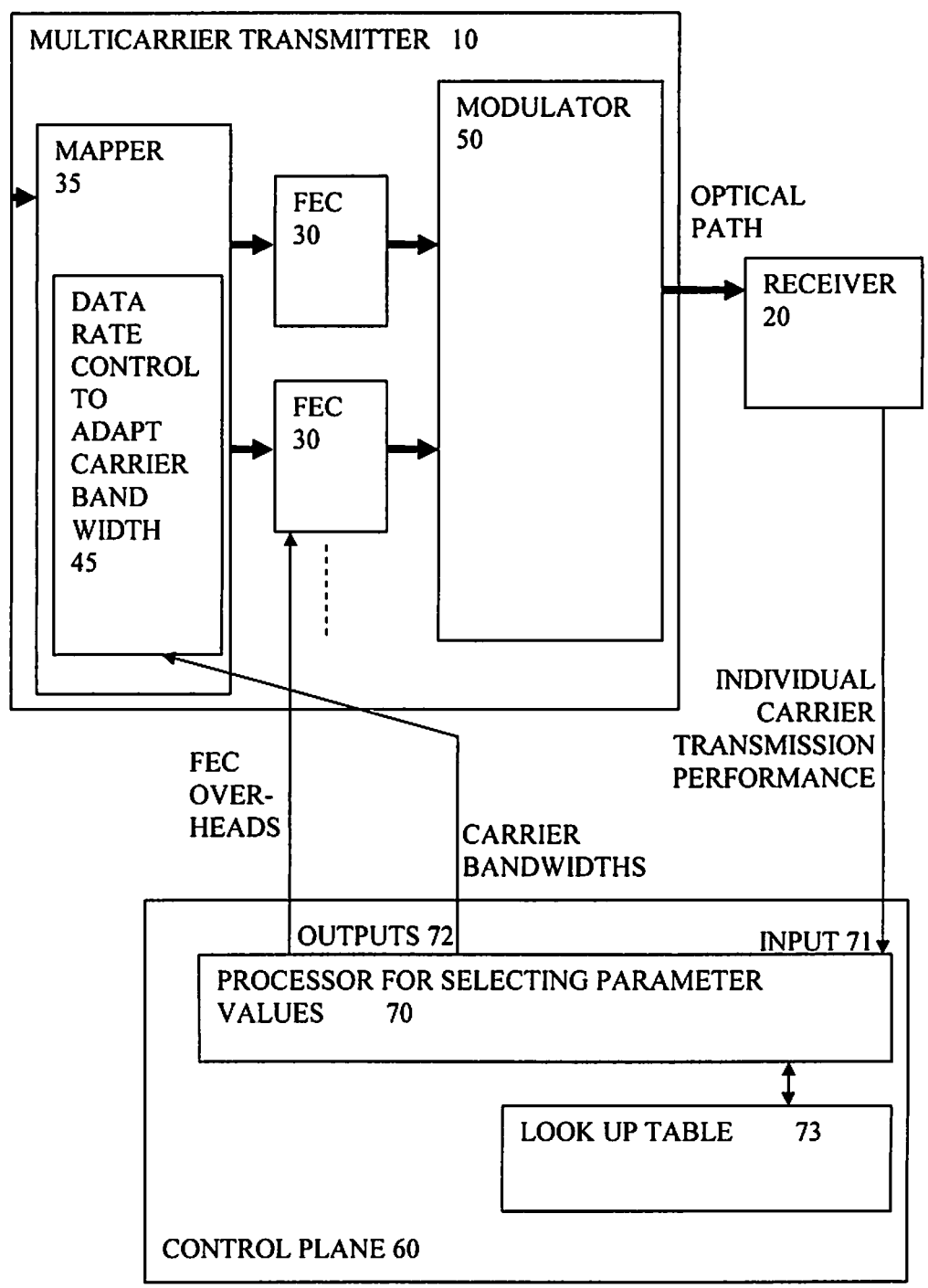
FIGS. 10 to 12 show embodiments with various ways to adapt carrier bandwidth.
Figure 11:
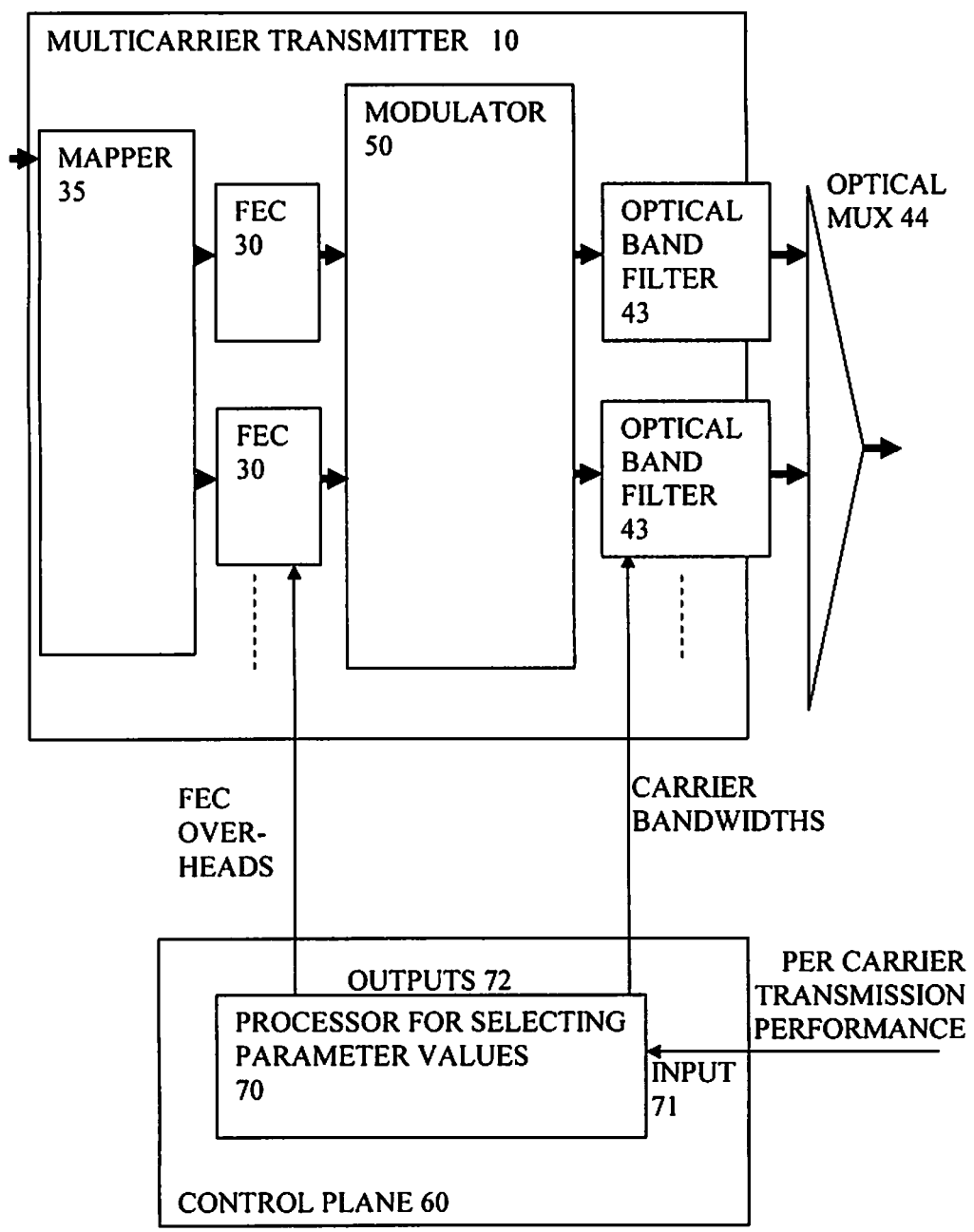
Figure 12:
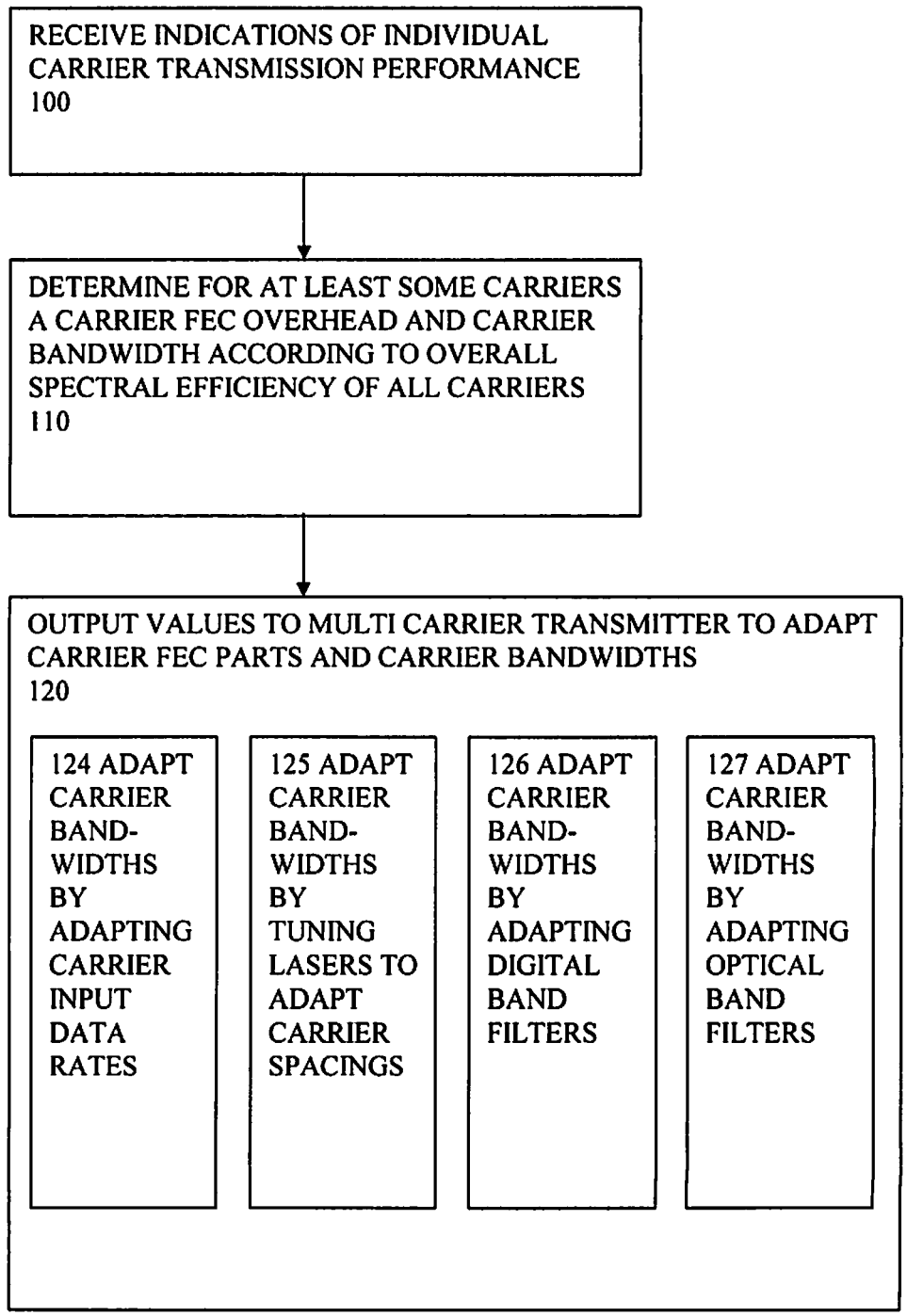

FIGS. 10 to 12, Examples with Different Ways to Adapt Carrier Bandwidth

FIG. 10 shows an example similar to the example of FIG. 1, but with the mapper 35 having a data rate control part 45 configured to adapt the carrier bandwidth by controlling a data rate for each carrier. This can have the effect of adapting the carrier bandwidth in two ways. If there is no overlap in the frequency domain between adjacent channels then a change in data rate will alter the effective guard band between the adjacent channels. If there is overlap between adjacent channels, then a change in data rate will alter the amount of overlap and thus change the effective carrier bandwidth. This can be an alternative to or can be combined with other ways of controlling the carrier bandwidths such as digital or optical filters. FIG. 10 also shows a look up table as one way of enabling the processor to look up possible values of carrier FEC overhead as a function of possible values of carrier bandwidth and as a function of the indicated carrier transmission performance. The look up table can also be used for looking up possible values of carrier bandwidth as a function of possible values of carrier FEC overhead and as a function of the indicated carrier transmission performance.

FIG. 11 shows an example similar to that of FIG. 1 but with optical band filters 43 for each of the carriers. An optical multiplexer 44 is provided to combine the carriers into the multicarrier signal. FIG. 12 shows an example of method steps similar to those of FIG. 2 and showing different ways of implementing step 120 to adapt carrier bandwidths. One of these ways is step 124, of adapting carrier input data rates as discussed above. Another is step 125 of tuning lasers to adapt optical carrier central optical frequencies, which can be used to adapt carrier spacings. This can enable guard bands or overlaps between adjacent carriers to be adapted as discussed above. Another way is step 126 of adapting bandwidth of digital band filters. Similarly, another way is step 127 of adapting bandwidth of optical filters.

As has been described, the features of various embodiments enable maximizing the transmission capacity over a given bandwidth in some cases, or minimizing the bandwidth for a given transmission capacity in other cases. The parameter selection can involve configuring mutually dependent parameters, namely, FEC overhead and carrier bandwidths, according to a given relationship, which can also depend on measured OSNR or BER. The FEC overheads and carrier bandwidths can be selected from a finite set of discrete values which may reduce the processing load compared to using continuously variable values. These examples can help with increasing spectral efficiency (SE) on installed fiber which is critical in allowing organisations to leverage their existing investments in fiber. Compatibility of high capacity channels with existing wavelengths can help extend current installed infrastructure beyond 100 Gb/s, with minimal need for infrastructure renewal.

Figure 13:
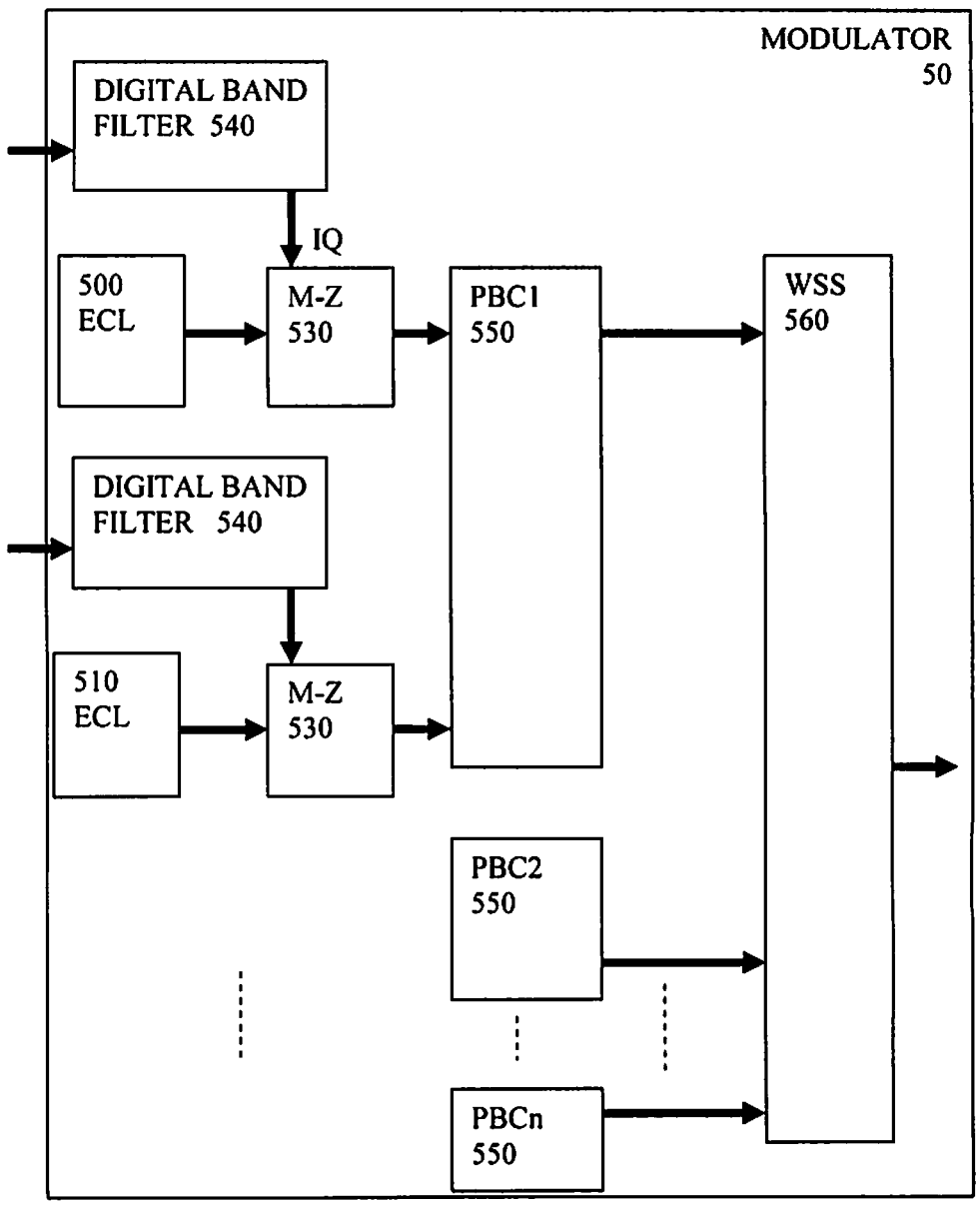
FIG. 13 shows an example of a modulator for use in embodiments.

FIG. 13, Example of Modulator

FIG. 13 shows a schematic view of a modulator for an example using a faster than Nyquist transmission over a SMF uncompensated fiber link with 100 GHz spaced 40 and 100 Gb/s co-propagating channels. The modulator has for each carrier a digital band filter 540 for filtering a corresponding data stream containing FEC overhead. The digital filters each have a bandwidth controllable by the processor shown in FIG. 1 for example. For each carrier, I and Q signals are fed to a Mach-Zehnder (M-Z) modulator 530, to modulate an optical carrier generated by a laser ECL 500, 510. Two or more modulated optical signals having the same wavelength but different polarizations are coupled by a polarization beam combiner PBC1 550 and fed to a WSS 560. Further pairs of carriers modulated onto different wavelengths are combined by further PBCs 550 shown as PBC2-n, and fed to the same WSS 560. The WSS can be used to shape the optical spectrum by providing optical band filtering for each carrier, instead of using digital band filters, or as well as the digital band filters. This arrangement can be used with the carrier FEC parts and processor for selecting parameters as shown in FIG. 1 for example.

Using faster than Nyquist principles discussed above using advanced signal processing techniques with the desired detector complexity, sub-channel bandwidths and inter-channel spacing are optimised for maximum SE to enable a 1 Tb/s superchannel to be transmitted within less than 200 GHz of spectral occupancy, with a SE of about 5.2 bit/s/Hz, instead of the usual 10×100 Gb/s occupying 500 GHz.

A total aggregate bit rate of 1.12 Tb/s is obtainable in a particular example having eight optical carriers, each modulated by a 140 Gb/s narrow filtered DP-QPSK signal, corresponding to 35 Gbaud. Sub-channels' bandwidth and spacing are optimized according to the FTN technique to maximize the achievable spectral efficiency. In particular, each sub-channel is narrow filtered by a 3rd-order Gaussian filter with 20 GHz full width at half maximum (FWHM) bandwidth (much lower than the Nyquist limit) and a pair of sub-channels are allocated in each 50 GHz slot. Moreover, unequal channel spacing (20/30 GHz) is adopted to account for the guard bands between adjacent 50 GHz WDM slots, unrequired by FTN but to enable a mid-link wavelength selective switch (WSS). The WSS can approximately be modelled as a 4th order Gaussian filter with 41 GHz FWHM bandwidth, leaving a 9 GHz unused guard band per slot (18% wasted spectral efficiency). The system can exploit different low density parity check (LDPC) codes to trade-off net SE and error correction capability: 9/10, 8/9, 5/6, 4/5, 3/4, 2/3 code rates can be configured, keeping constant the line rate, depending on accumulated OSNR and propagation penalties, to realize an adaptive optical interface capable of finely adjusting the transmitted capacity to the propagation conditions. A 64800 bit code word is used and an error floor can be reduced further by properly concatenating outer hard-decision codes, with small additional overhead (<4%), complexity, and latency. The odd and even channels are separately modulated by means of two integrated double nested Mach-Zehnder modulators (IQ-MZM). By applying 35 Gb/s coded electrical binary signals to the in-phase (I) and quadrature (Q) ports of the modulators, 70 Gb/s DP-QPSK channels can be obtained. The bit rate is then further doubled up to 140 Gb/s per channel, by polarization multiplexing through the polarization beam combiner (PBC). At the receiver side, coherent polarization-diversity detection with digital signal processing can be exploited to compensate for accumulated dispersion and other linear impairments (for example polarization rotation, residual dispersion, polarization mode dispersion).

Other variations and additions can be envisaged within the claims.

The invention claimed is:

1. Apparatus for controlling parameters of an optical multi carrier signal having a modulation format and comprising a plurality of individual carrier signals, the apparatus having:
   an input for receiving an indication of individual carrier transmission performance of at least one of the individual carrier signals;
   a processor for selecting parameter values for said at least one of the individual carrier signals, the parameter values comprising both a carrier Forward Error Correction (FEC) overhead and a carrier bandwidth for the modulation format, according to the indicated individual carrier transmission performance and according to a resulting overall spectral efficiency of the optical multi carrier signal; and
   an output for outputting the said selected parameter values for control of the optical multi carrier signal,
   the processor being further configured to:
   receive an indication of a desired total bandwidth limit for the multi carrier signal, and to make the selections of the carrier FEC overhead and carrier bandwidth according to that total bandwidth limit; or receive an indication of a desired total transmission capacity for the multi carrier signal and to make the selections of the carrier FEC overhead and the carrier bandwidth according to that total transmission capacity.

2. The apparatus of claim 1, the processor being configured to select carrier bandwidth for said at least one of the carriers of the multi carrier signal to provide faster than Nyquist operation.

3. The apparatus of claim 1, the processor being configured to select a carrier spacing according to the indicated individual carrier transmission performance and according to the resulting overall spectral efficiency of the optical multi carrier signal.

4. The apparatus of claim 1, the processor also being configured to control a mapper, to adapt a mapping of payload onto different ones of the carriers according to the selected parameter values.

5. The apparatus of claim 1, having a look up table having possible values of carrier FEC overhead as a function of possible values of corresponding carrier bandwidth and the indicated corresponding carrier transmission performance, and having possible values of corresponding carrier bandwidth as a function of possible values of carrier FEC overhead and the indicated corresponding carrier transmission performance.

6. The apparatus of claim 1, the processor being configured to update the selection of parameter values periodically.

7. A network management system having the apparatus of claim 1.

8. The apparatus of claim 5, the processor being configured to determine an overall spectral efficiency achieved by respective different combinations of possible values of carrier FEC overhead and corresponding carrier bandwidth from the look up table, and configured to make the selections of carrier FEC overhead and carrier bandwidth by selecting from the different combinations according to the determined overall spectral efficiencies.

9. A method of controlling parameters of an optical multi carrier signal having a modulation format and comprising a plurality of individual carrier signals, the method having the steps of:

receiving an indication of individual carrier transmission performance of at least one of the individual carrier signals;

selecting parameter values for said at least one of the individual carrier signals, the parameter values comprising both a carrier FEC overhead and a carrier bandwidth for the modulation format, according to the indicated individual carrier transmission performance and according to an overall spectral efficiency of the multi carrier signal; and outputting the said selected parameter values for control of the optical multi carrier signal, the method further having the step of:

receiving an indication of a desired total bandwidth limit for the multi carrier signal, the selecting of the parameter values for both the carrier FEC overhead and the carrier bandwidth further being carried out according to that total bandwidth limit; or receiving an indication of a desired total transmission capacity for the multi carrier signal, the selecting of the parameter values for both the carrier FEC overhead and the carrier bandwidth being carried out according to that total transmission capacity.

10. The method of claim 9, the carrier bandwidth being selected to provide faster than Nyquist operation.

11. The method of claim 9, having the step of selecting a carrier spacing according to the indicated individual carrier transmission performance and according to the resulting overall spectral efficiency of the optical multi carrier signal.

12. The method of claim 9, having a step of adapting a mapping of payload onto different ones of the carriers according to the selected parameter values.

13. The method of claim 9, having steps of using a look up table to determine possible values of carrier FEC overhead as a function of possible values of corresponding carrier bandwidth and the indicated corresponding carrier transmission performance, and to determine possible values of corresponding carrier bandwidth as a function of possible values of carrier FEC overhead and the indicated corresponding carrier transmission performance.

14. The method of claim 9, having the step of updating the selection of parameter values periodically.

15. The method of claim 13 having the step of determining an overall spectral efficiency achieved by respective different combinations of possible values of carrier FEC overhead and corresponding carrier bandwidth, and making the selections by selecting from the different combinations according to their respective overall spectral efficiencies.

16. A nontransitory computer readable medium comprising instructions which, when executed by a processor, cause the processor to carry out a method of controlling parameters of an optical multi carrier signal having a modulation format and comprising a plurality of individual carrier signals, the method having the steps of:

receiving an indication of individual carrier transmission performance of at least one of the individual carrier signals;

selecting parameter values for said at least one of the individual carrier signals, the parameter values comprising both a carrier FEC overhead and a carrier bandwidth for the modulation format, according to the indicated individual carrier transmission performance and according to an overall spectral efficiency of the multi carrier signal; and outputting the said selected parameter values for control of the optical multi carrier signal, the method further having the step of:

receiving an indication of a desired total bandwidth limit for the multi carrier signal, the selecting of the parameter values for both the carrier FEC overhead and the carrier bandwidth further being carried out according to that total bandwidth limit; or receiving an indication of a desired total transmission capacity for the multi carrier signal, the selecting of the parameter values for both the carrier FEC overhead and the carrier bandwidth being carried out according to that total transmission capacity.

* * * * *